United States Patent
Natsumeda et al.

(12) 
(10) Patent No.: US 12,130,616 B2
(45) Date of Patent: Oct. 29, 2024

(54) APPROACH TO DETERMINING A REMAINING USEFUL LIFE OF A SYSTEM

(71) Applicant: NEC Laboratories America, Inc., Princeton, NJ (US)

(72) Inventors: Masanao Natsumeda, Princeton Junction, NJ (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 651 days.

(21) Appl. No.: 17/358,260

(22) Filed: Jun. 25, 2021

(65) Prior Publication Data

US 2022/0004182 A1 Jan. 6, 2022

Related U.S. Application Data

(60) Provisional application No. 63/047,384, filed on Jul. 2, 2020.

(51) Int. Cl.
*G05B 23/02* (2006.01)
*G06N 3/045* (2023.01)
*G06N 3/08* (2023.01)

(52) U.S. Cl.
CPC ....... *G05B 23/0283* (2013.01); *G05B 23/024* (2013.01); *G05B 23/0272* (2013.01); *G06N 3/045* (2023.01); *G06N 3/08* (2013.01)

(58) Field of Classification Search
CPC .............. G05B 23/0283; G05B 23/024; G05B 23/0272; G06N 3/045; G06N 3/08
See application file for complete search history.

(56) References Cited

U.S. PATENT DOCUMENTS

| | | | |
|---|---|---|---|
| 2003/0023404 A1* | 1/2003 | Moselhi | G01N 21/954 702/181 |
| 2017/0368682 A1* | 12/2017 | Danjo | G06N 3/049 |
| 2018/0046902 A1* | 2/2018 | Liao | G06N 3/045 |

(Continued)

OTHER PUBLICATIONS

Wang et al., "Remaining Useful Life Estimation Using Functional Data Analysis", arxiv:1904.06442v1 [cs.LG] Apr. 12, 2019, pp. 1-9.

(Continued)

*Primary Examiner* — Lina Cordero
*Assistant Examiner* — Lyudmila Zaykova-Feldman
(74) *Attorney, Agent, or Firm* — Joseph Kolodka (57) ABSTRACT

Systems and methods for determining a remaining useful life of a system. The system and method include one or more processors; a memory coupled to the one or more processors; a data acquisition unit configured to receive run-to-failure time series data; a neural network training unit configured to train a neural network model to determine a point in time that a health index changes from a healthy stage to a degradation stage; a remaining useful life estimation unit configured to estimate a first remaining useful life of the system based on the point in time; estimate a second remaining useful life of the system by converting a feature representation output by the second neural network; minimize the difference between the first remaining useful life and the second remaining useful life; classify the health stage based on a probability; and an output unit configured to send a warning to a user.

20 Claims, 8 Drawing Sheets

(56) References Cited

U.S. PATENT DOCUMENTS

| | | | | |
|---|---|---|---|---|
| 2019/0057307 | A1* | 2/2019 | Zheng | G06N 3/044 |
| 2019/0187212 | A1* | 6/2019 | Garcia | G01R 31/382 |
| 2019/0294413 | A1* | 9/2019 | Vantrease | G06F 7/5095 |
| 2019/0354836 | A1* | 11/2019 | Shah | G06N 3/045 |
| 2019/0384257 | A1* | 12/2019 | Zhang | G06F 11/008 |
| 2020/0285964 | A1* | 9/2020 | Cao | G06N 3/047 |
| 2020/0293284 | A1* | 9/2020 | Vantrease | G06N 3/08 |
| 2020/0337580 | A1* | 10/2020 | Oh | A61B 5/7267 |
| 2021/0033680 | A1* | 2/2021 | Ukumori | G01R 31/392 |
| 2021/0284179 | A1* | 9/2021 | Diamond | B60W 50/00 |
| 2022/0353803 | A1* | 11/2022 | Wang | H04L 41/16 |

OTHER PUBLICATIONS

Zhang et al., "Remaining Useful Life Estimation Using Long Short-Term Memory Neural Networks and Deep Fusion", IEEE Access vol. 8, Jan. 30, 2020, pp. 19033-19045.

Natsumeda et al., "RULENet: End-to-end Learning with the Dual-estimator for Remaining Useful Life Estimation", 2020 IEEE International Conference on Prognostics and Health Management (ICPHM), Jun. 8, 2020, pp. 1-8.

Babu et al., "Deep Convolutional Neural Network Based Regression Approach for Estimation of Remaining Useful Life", Institute for Infocomm Research, Apr. 16, 2016, pp. 1-15.

Zheng et al., "Long short-term memory network for remaining useful life estimation", In 2017 IEEE international conference on prognostics and health management (ICPHM) Jun. 19, 2017, pp. 88-95.

Vaswani et al., "Attention is all you need", arXiv preprint arXiv:1706.03762, Jun. 12, 2017, pp. 1-15.

* cited by examiner

APPROACH TO DETERMINING A REMAINING USEFUL LIFE OF A SYSTEM

RELATED APPLICATION INFORMATION

This application claims priority to Provisional Patent Application No. 63/047,384, filed on Jul. 2, 2020, incorporated herein by reference in its entirety.

BACKGROUND

Technical Field

The present invention relates to using neural networks to determine a remaining useful life of a system, and more particularly to using stacked long short term memory neural networks and a multi-layer perceptron to determine a remaining useful life of a system.

Description of the Related Art

Engineers schedule and carry out maintenance or other actions to maintain a system's performance above a threshold. With increasing system complexity, regularly scheduled preventive maintenance is becoming less capable of meeting the increasing industrial demands. Remaining Useful Life (RUL) estimation is an element in predictive maintenance. Remaining Useful Life (RUL) of a system (e.g., piece of equipment) or one or more components of a system is the time left until the equipment or component may need to be repaired or replaced, for example, when it would be likely or expected to fail. Failing to replace or repair equipment or components before they fail can be much more expensive than the repair or replacement, and can also result in damage to a company's reputation due to unexpected down-time that can result in being unable to meet deadlines.

A time series is a group of observations on a single entity over time. Time series data is a collection of observed values for the single entity at different times that are sequential. Time series data has a natural time order, where that is the order in which the data was observed. The data can be gathered or become available at regular time intervals or at irregular time intervals. There can be multiple/different sensor/observation readings for the same entity over a time frame, and/or the same sensor/observation reading for multiple/different entities.

SUMMARY

According to an aspect of the present invention, a method is provided for determining a remaining useful life (RUL) of a system. The method includes, feeding historic time series data into a first neural network and a second neural network to train the first and second neural networks; determining a point in time that a health index (HI) changes from a healthy stage in the system's life to a degradation stage by converting a feature representation output by the first neural network; estimating a first remaining useful life of the system based on the point in time that the health index (HI) changes from a healthy stage in the system's life to a degradation stage provided using a third neural network; estimating a second remaining useful life of the system by converting a feature representation output by the second long short term memory neural network; minimizing the difference between the first remaining useful life and the second remaining useful life; classifying the health stage at RUL estimation to suppress false positive alarms based on a probability of the healthy stage and a degradation stage; and sending a warning to a user based on the determination that the system is in a degradation stage.

According to another aspect of the present invention, a computer system is provided for determining a remaining useful life (RUL) of a system. The computer system includes one or more processors; a memory coupled to the one or more processors; a data acquisition unit configured to receive run-to-failure time series data; a neural network training unit configured to train a neural network model to determine a point in time that a health index (HI) changes from a healthy stage in the system's life to a degradation stage by converting a feature representation output by the first neural network; a remaining useful life estimation unit configured to estimate a first remaining useful life of the system based on the point in time that the health index (HI) changes from a healthy stage in the system's life to a degradation stage provided using a third neural network; estimate a second remaining useful life of the system by converting a feature representation output by the second long short term memory neural network; minimize the difference between the first remaining useful life and the second remaining useful life; classify the health stage at RUL estimation to suppress false positive alarms based on a probability of the healthy stage and a degradation stage; and an output unit configured to send a warning to a user based on the determination that the system is in a degradation stage.

According to another aspect of the present invention, a computer program product for determining a remaining useful life (RUL) of a system is provided. The computer program product includes instructions executable by a computer to cause the computer to perform a method of feeding historic time series data into a first neural network and a second neural network to train the first and second neural networks; determining a point in time that a health index (HI) changes from a healthy stage in the system's life to a degradation stage by converting a feature representation output by the first neural network; estimating a first remaining useful life of the system based on the point in time that the health index (HI) changes from a healthy stage in the system's life to a degradation stage provided using a third neural network; estimating a second remaining useful life of the system by converting a feature representation output by the second long short term memory neural network; minimizing the difference between the first remaining useful life and the second remaining useful life; classifying the health stage at RUL estimation to suppress false positive alarms based on a probability of the healthy stage and a degradation stage; and sending a warning to a user based on the determination that the system is in a degradation stage.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for constructing a RUL estimation model is built with given multivariate time series data and a historical record, and utilizing the RUL estimation model to estimate the Remaining Useful Lifetime (RUL) of equipment based on sensor input. Once the model is trained, it can periodically estimate the RUL using a segment of time series data. If the RUL is shorter than a pre-determined threshold, a computer system (e.g., server) can notify a user that the RUL is expected to expire. In RUL estimation, deep neural networks can directly map given observations to a RUL.

Due to the nature of the measurement and/or degradation, accurate estimation of RUL is not always feasible. RUL decreases linearly over time, but HI does not always decrease in a similar manner due to nonlinearity in the degradation process. There can be a healthy stage followed by a degradation stage. At the beginning of use, degradation in a system can be negligible and the health index (HI) does not change or changes minimally. Approaching the end of life of the system, the degradation becomes more noticeable and even severe and the HI starts to change more quickly.

In one or more embodiments, a framework of end-to-end learning for RUL estimation is provided. The stability of the training of the model can be improved using a proposed end-to-end framework. A classification can be incorporated into the model's loss function. The term, called classification loss, stabilizes the training since it gives another aspect of the change point in the health stages. In various embodiments, an additional component, Vec2St, can be added to classify health stage(s) at the RUL estimation to suppress false positive alarms.

In various embodiments, a neural network can be trained to predict the RUL of a monitored system given partial temporal observation samples of a time-series sequence.

In various embodiments, a deep neural network can include a converter that changes the time series set (Tss) into a vector, which is referred to as Tss2vec, and a converter that changes a vector to RUL, which is referred to as Vec2HI, where HI refers to a health index. In RUL estimation, a deep neural networks can directly map given observations to RUL. In this framework, RUL may used as a substitute for a health index (HI). In various embodiments, a Long Short-Term Memory (LSTM) can be used as Tss2vec, and a Multi-layer Perceptron can be used as Vec2HI. An LSTM is a type of recurrent neural network (RNN) structure that can model long-range dependencies of a sequence. The LSTM has a memory cell which acts as an accumulator of state information for the sequence. The LSTM has a memory cell with a number of gates that control the flow of information into and out of the cell. The cell output may be propagated to a final state based on an output gate. A gradient can be trapped in the cell and prevented from vanishing. Multiple LSTMs can be stacked and temporally concatenated.

In various embodiments, Predictive Maintenance can be used to monitor an equipment's and/or component's condition and identify maintenance program(s). Predictive Maintenance can include: 1) a remaining useful life estimation, which estimates the remaining time to the end of the equipment's useful life, and 2) failure prediction, which predicts the probability that the equipment will fail within a predetermined time frame. Data-driven approaches can utilize sensor and operational data to estimate RUL, where the data can be collected as a time series. This approach can involve large amounts of data that may be generated by monitoring many equipment and performance characteristics at different time intervals over extended periods, where the monitoring can be conducted by a plurality of different sensors.

There are many systems which the present invention is applicable to, for example, chemical plants, aircraft, and railway system. In general, those systems in the real world equip sensors in order to monitor its status and their readings are saved as multivariate time series in a database. In addition, there is an operation to record historical events including failures and maintenance. If the event is a failure or maintenance, the description in historical records contains its name, solution, and fault components. In various embodiments, limit deep learning (DL) models can be used for safety-critical applications.

Remaining Useful Life (RUL) estimation can be utilized for Prognostics and Health Management [1], which aims to enhance the effective reliability and availability of a physical system in-service by detecting current and approaching failures and by providing mitigation of the system risks. The pipeline for RUL estimation can include four phases, including data acquisition, Health Index (HI) construction, health stage division, and RUL estimation. RUL estimation can be challenging because information can come from multiple sensors with different data channels.

It is to be understood that aspects of the present invention will be described in terms of a given illustrative architecture; however, other architectures, structures, and process features and steps can be varied within the scope of aspects of the present invention.

Figure 1:
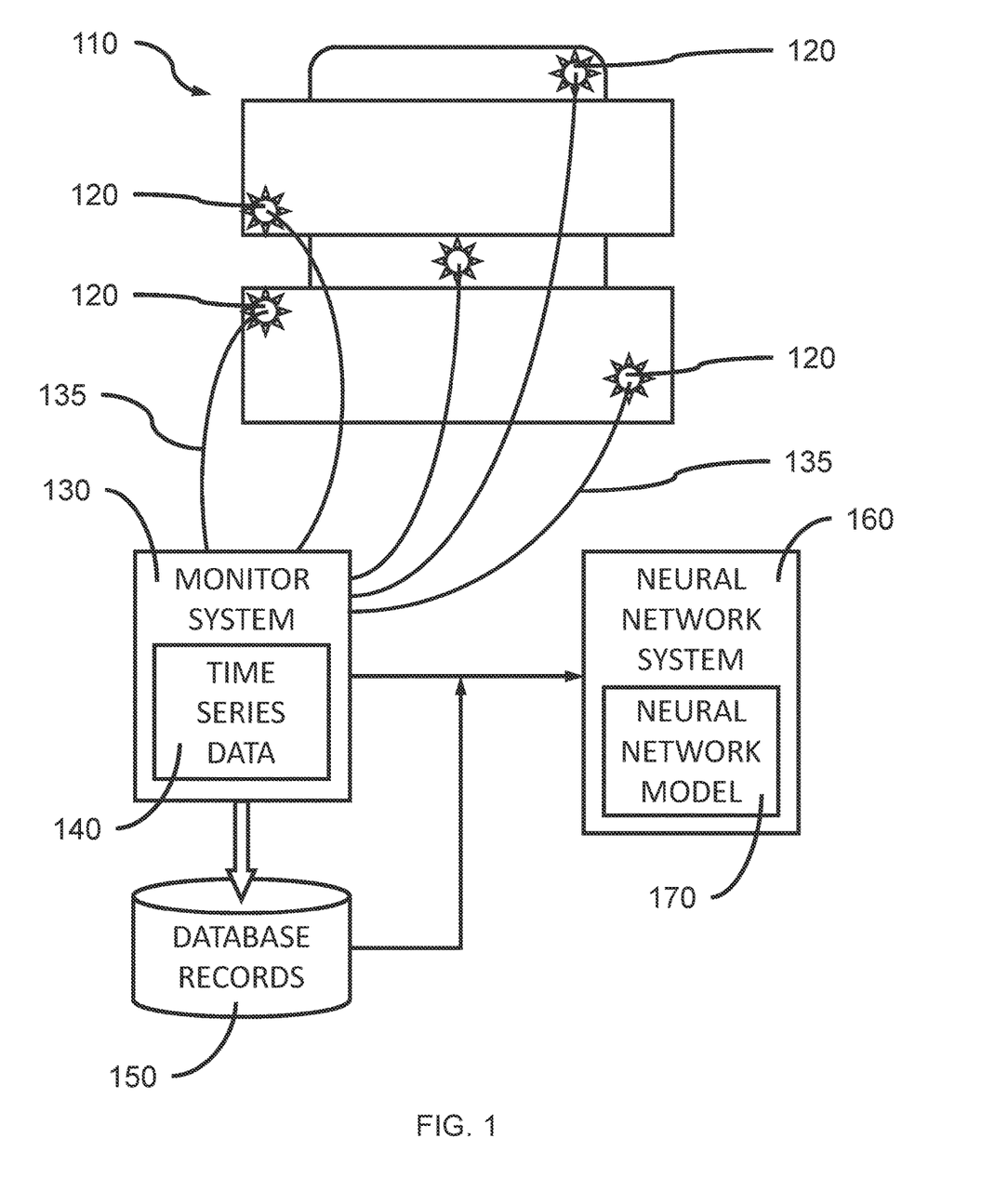
FIG. 1 is a block/flow diagram illustrating a high-level system/method for neural network training based on time series data, in accordance with an embodiment of the present invention.

Referring now in detail to the figures in which like numerals represent the same or similar elements and initially to FIG. 1, a high-level system/method for neural network training based on time series data, in accordance with an embodiment of the present invention is illustratively depicted in accordance with an embodiment of the present invention.

In various embodiments, a plurality of sensors 120 can be associated with a system 110, where the sensors 120 can produce multivariate time series data for the associated system. The plurality of sensors 120 can collect measurements of different attributes of the system, where the measurements can be collected as a time series. The sensors 120 can be in electronic communication with a monitoring system 130 that receives time series data from each of the sensors 120, where the sensors can be in electronic communication with the monitor system 130 over wired and/or wireless communication paths 135. The received and collected time series data 140 can be stored in a database 150, where the multivariate time series data can be stored as one or more database records. The stored time series data can form a historical record of the performance of the system 110 based on the monitored attributes. The data and record(s) can include a time period to the end-of-life for the system 110, which can include details regarding system failures and system maintenance.

In various embodiments, the time series data 140 can be used by a neural network training system 160 to train a neural network model 170, such that the neural network model can predict the remaining useful life of the system 110, and a health index (HI) for the system 110, for scheduling predictive maintenance. An operator can use the predicted RUL and scheduled predictive maintenance to maintain the monitored system.

In various embodiments, the neural network training system 160 (also referred to as "RULENet") can simultaneously optimizes a Dual-estimator for RUL estimation and its feasible range estimation. The Dual-estimator can consist of five components: Tss2vec, Tss2Mat, Vec2HI, Mat2HIch, and HIch2HI. Tss2vec outputs a feature representation v(k, j), and Vec2HI gives RUL estimation at j as $H_1(k,j)$ based upon the $j^{th}$ time index, v(k, j). Mat2HIch can convert feature representation V(k) to the change point, $H_{ch}^{(k)}$, of HI. HIch2HI gives RUL estimation at j as $H_2(k;j)$ based upon $H_{ch}(k)$. The neural network can learn feature representation from the multivariate time series data for RUL estimation without taking $H_{ch}$ as an input, and accurately estimate RUL based upon the representation.

In various embodiments, let $x \in \mathbb{R}^{L \times A}$, where L denotes the length of the time series, A denotes the number of attributes, e.g., sensor readings or operational settings. Let $H \in \mathbb{R}$ be HI at the end of the time series data, x. Let $RUL \in \mathbb{R}$ be the RUL of H. Time series data from the past to current time can be used to generate a feature vector.

In various embodiments, time series data 140 from the past to the current time is used to generate a feature vector. To eliminate undesirable effects from the past, a sliding window can be utilized to extract subsequences for Tss2Vec and Tss2Mat.

In various embodiments, a component, Vec2St, can be added to classify the health stage at RUL estimation to suppress false positive alarms, where "St" refers to stage.

In various embodiments, classification can be incorporated into the model's loss function. The addition of a classification loss can stabilize the training, since it provides another aspect of the change point in the health stages.

In various embodiments, available data for training can be divided into training data and validation data. The model can be trained with the mini-batch gradient descent and its parameters are optimized with every training sample for the number of iteration, so called epochs. For each epoch, a performance metric can be computed for the validation data. If the performance metric is better than that from previous epoch, the newer parameters can be kept as the best parameters at the moment. In order to determine the best hyperparameters, a cross-validation method may be employed.

Figure 2:
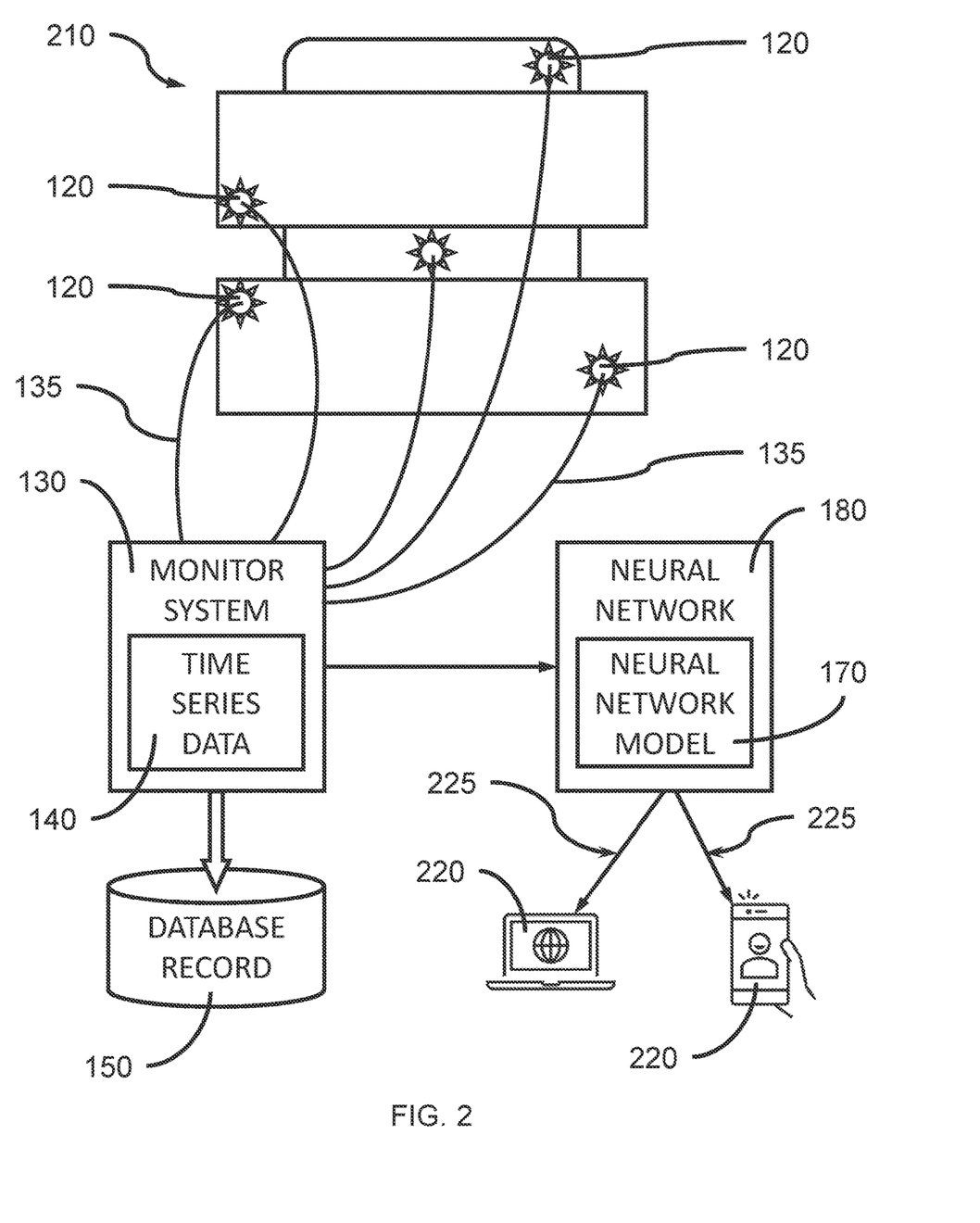
FIG. 2 is a block/flow diagram illustrating a high-level system/method for neural network implementation using time series data received from system sensors, in accordance with an embodiment of the present invention.

FIG. 2 is a block/flow diagram illustrating a high-level system/method for neural network implementation using time series data received from system sensors, in accordance with an embodiment of the present invention.

Once the model is trained, it can periodically estimate RUL using the received segment(s) of time series data. If the determined RUL is shorter than a predetermined threshold, the neural network system 180 can notify 225 that information to the users through a client device 220. A system can undergo maintenance or by replaced based on the determined remaining useful life (RUL).

In various embodiments, time series data 140 can be collected from a system 210 while the system is operating, and the time series data 140 can be fed into a neural network system 180 having the trained neural network model 170 to determine the state of the system 210 and predict the remaining useful life and health index of the system 210. The neural network system 180 can communicate to a user device 220 that the system 210 may be in need of preventative maintenance or nearing it's end-of-life.

Figure 3:
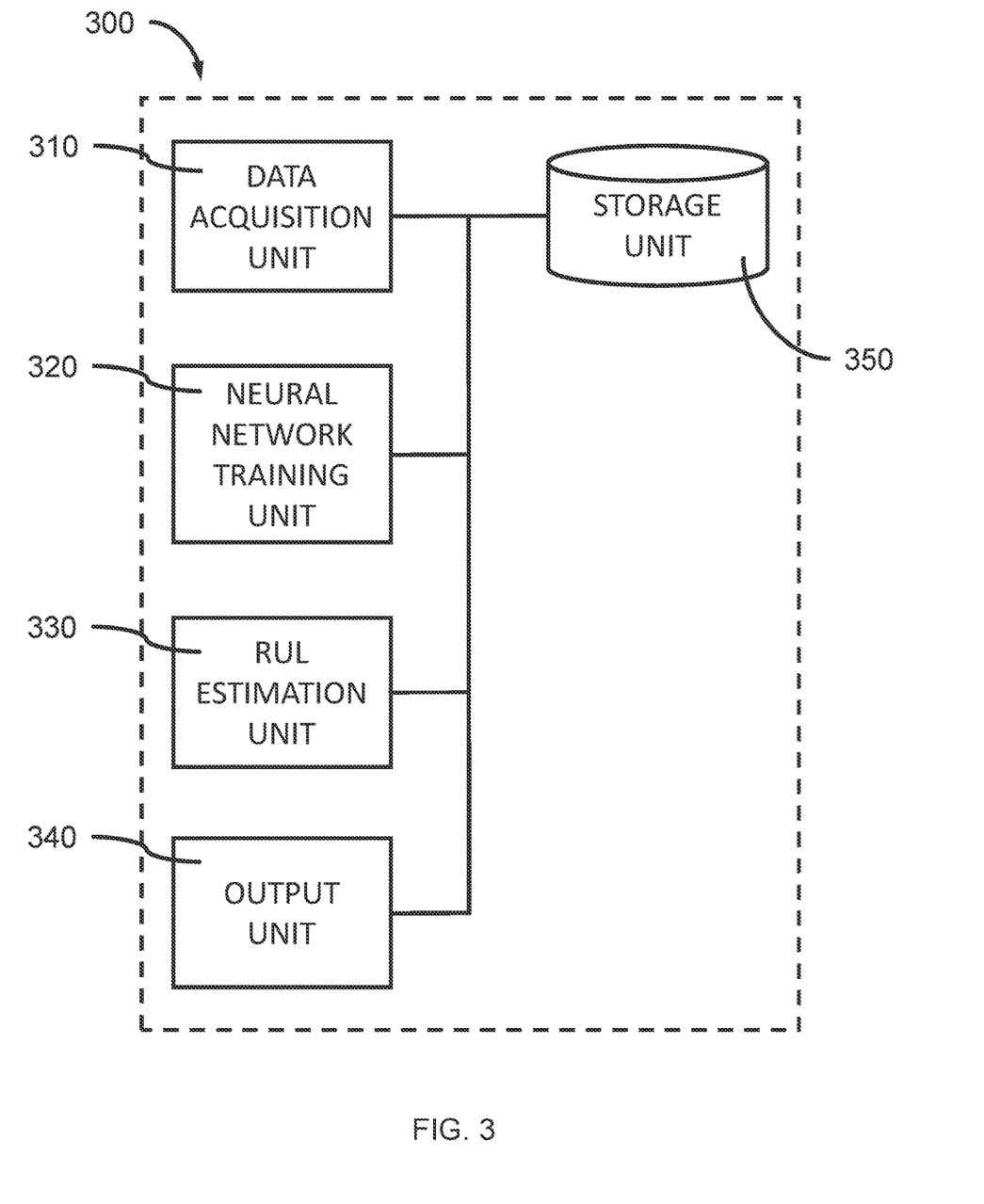
FIG. 3 is a flow diagram illustrating a system for implementing a neural network based system for remaining useful life (RUL) estimation, in accordance with an embodiment of the present invention.

FIG. 3 is a flow diagram illustrating a system for implementing a neural network based system for remaining useful life (RUL) estimation, in accordance with an embodiment of the present invention.

In various embodiments, the neural network system 300 can include a data acquisition unit 310, a learning unit 320, an RUL estimation unit 330, an output unit 340, and a storage unit 350. In various embodiments, the data acquisition unit 310 can be configured to obtain and receive run-to-failure time series data 140 from a monitoring system 130, sensors 120, and database 150 for training the neural network model 170, estimating RUL, and showing results. The learning unit 320 can be configured for training the neural network model 170. Then RUL estimation unit 330 can be configured to estimate the RUL. The output unit 340 can be configured to provide output to users and user devices 220. The storage unit 350 can store one or more neural network models 170, and be in communication with the data acquisition unit 310, learning unit 320, RUL estimation unit 330, output unit 340, and storage unit 350.

In various embodiments, the data acquisition unit 310 and the learning unit 320 can form the neural network training system 160 to train the neural network model 170.

In various embodiments, the neural network system 300 can include one or more processor(s) (e.g., CPUs, GPUs), one or more types of memory (e.g., DRAM, SRAM, FLASH, magnetic, optical, etc.), communications bus(es) and controllers (e.g., memory management unit), and input/output devices (e.g., display(s), keyboard, mouse, etc.).

Figure 4:
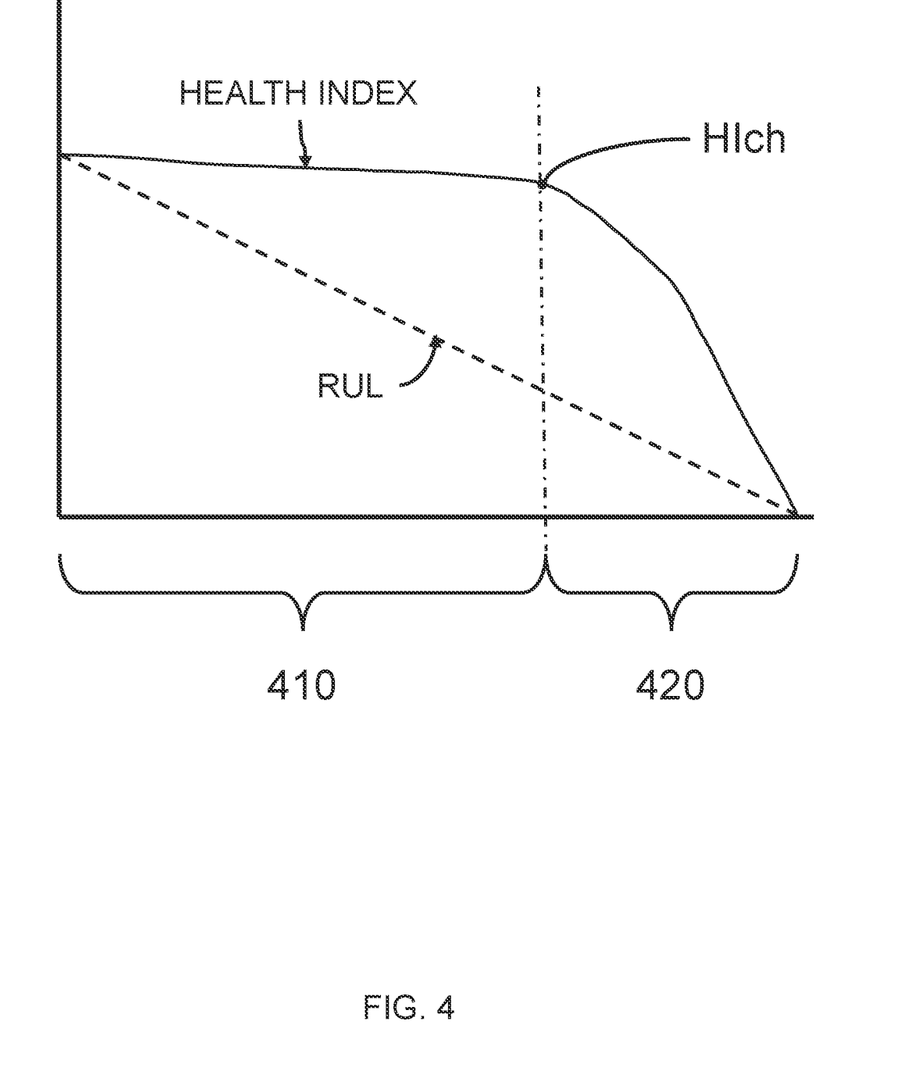
FIG. 4 is a graph illustrating a relationship between remaining useful life and a health index (HI), in accordance with an embodiment of the present invention.

FIG. 4 is a graph illustrating a relationship between remaining useful life and a health index (HI), in accordance with an embodiment of the present invention.

RUL linearly decreases over time, but the health index (HI) does not always due to nonlinearity in degradation process. It can be severe especially when the degradation process has multi-stages. The whole lifetime of a system can be divided into two or more different health stages. In various embodiments, a healthy stage 410 can be followed by degradation stage 420. At the beginning of use, for example, of a piece of equipment, the degradation in the system can be negligible and the health index (HI) does not change appreciably or at all. However, on approaching an end of life, the degradation can become severe and the HI starts to change noticeably. A point in time where the monitored system changes from a healthy stage to a degrading stage may be determined.

In addition, there can be limitations to getting a true HI due to several reasons, e.g. modeling error and observational error. In order to deal with this scenario, a piece-wise RUL function can be utilized, which limits the maximum RUL to a constant value. Let $H_{ch} \in \mathbb{R}$ be a constant value indicating a change point in the slope of HI. RUL is then given by:

$$RUL = \min(H, H_{ch}),$$

where H is a variable holding a value of HI, and 'min' returns the minimum value in the given list of arguments. This makes this calculated RUL different from the true RUL, where it is the same as HI only when the RUL is smaller than $H_{ch}$.

$$RUL = \begin{cases} H, & H < H_{ch} \\ \text{uncertain}, & \text{otherwise} \end{cases}$$

This separates RUL into two regions based on $H_{ch}$. A feasible range of RUL estimation is defined by $H_{ch}$. $H_{ch}$ can be determined by upstream tasks or domain knowledge. It costs a lot or restricts the scalability.

Figure 5:
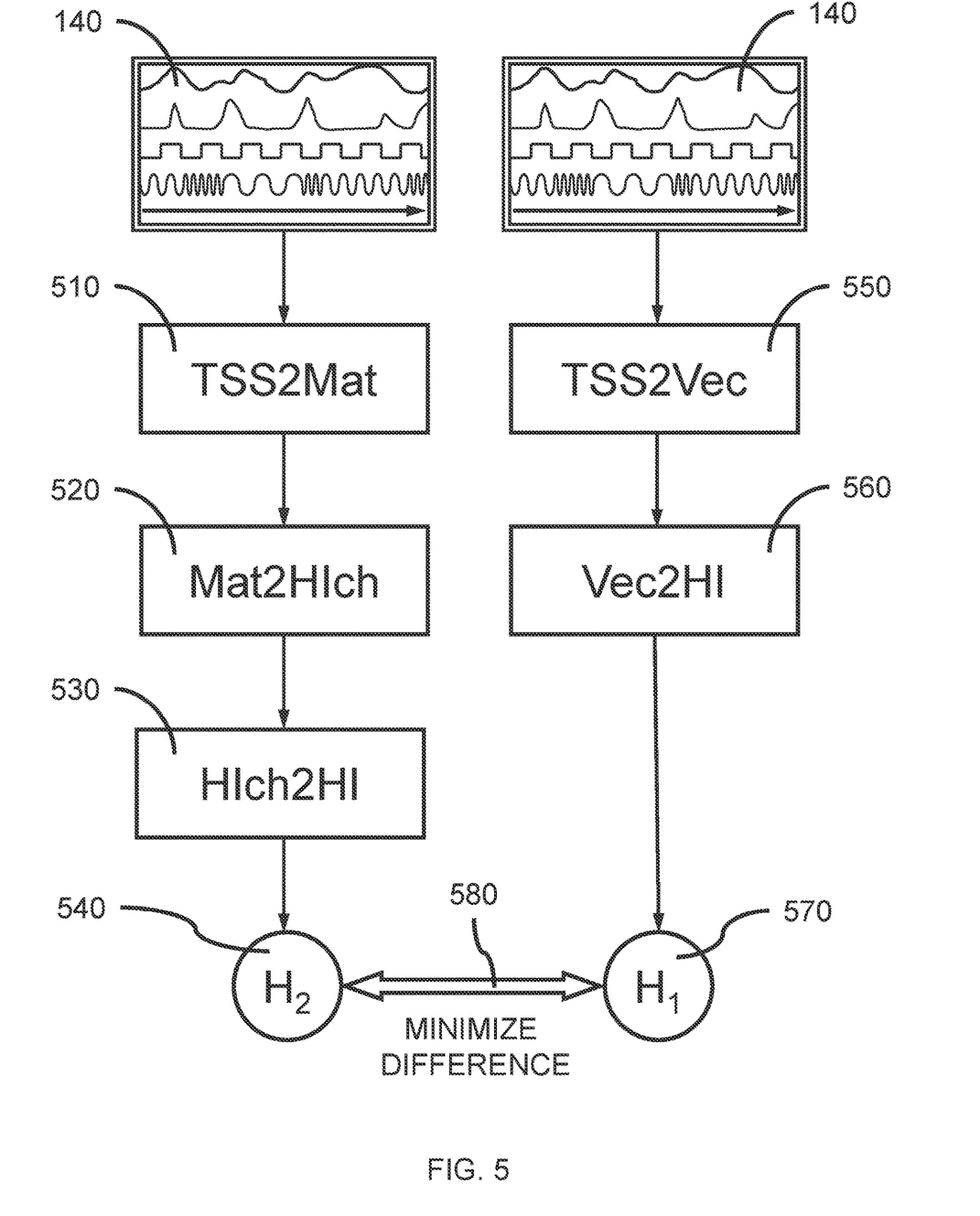
FIG. 5 is a block/flow diagram illustrating a high-level system/method for a dual estimator RUL model implementing TSS2Vec with Vec2HI and TSS2Mat with Mat2HIch and HIch2HI, in accordance with an embodiment of the present invention.

FIG. 5 is a block/flow diagram illustrating a high-level system/method for a dual estimator RUL model implementing TSS2Vec with Vec2HI and TSS2Mat with Mat2HIch and HIch2HI, in accordance with an embodiment of the present invention.

In various embodiments, the neural network training system 160 (RULENet) simultaneously optimizes a Dual-estimator for RUL estimation and its feasible range estimation. The Dual-estimator can consist of five components: Tss2Mat 510, Tss2vec 550, Mat2HIch 520, Vec2HI 560, and HIch2HI 530. Mat refers to matrix, and Tss2Mat refers to time series set to matrix. HI refers to health index, and $HI_{ch}$ refers to health index change. The Dual-estimator can use all components at training and can use Tss2vec 550 and Vec2HI 560 for inference at run time.

Mat2HIch 520 can estimate a point in time that the health index (HI) changes from a healthy stage or region 410 in the system's lifespan to a degradation stage or region 420, where the health index, HI, changes appreciably compared to the healthy region or stage 410. The Mat2HIch function 520 can change a matrix into a value for HIch.

In various embodiments, let $X^{(k)}$ be the $k^{th}$ example from K run-to-failure data X, where $X^{(i,lk)}$ represents the observation at the point of failure. Here i denotes the time index in run-to-failure data whose smaller value indicates older records, $l_k$ denotes the length of the $k^{th}$ time series. A denotes the number of attributes, e.g. sensors or operational setting.

Note that a subsequence of $X^{(k)}$ can be x and this is not limited to run-to failure data. It can also be run-to-event data, which is time series data collected during a period from a usual status to a certain status, for example a status which requires maintenance.

In various embodiments, let $x^{(k,j)}$ be a subsequence of $X^{(k)}$ ending at a $j^{th}$ time index; let $v^{(k,j)}$ be a feature representation of each $x^{(k,j)}$; and let $V^{(k)} = [v^{(k,1)}, v^{(k,2)}, \ldots, v^{(k,lk)}]$ be the feature representation for the entire $X^{(k)}$. Note that the beginning of $x^{(k,j)}$ can be at the beginning of $X^{(k)}$ but not necessary. Given $x^{(k,j)}$, Tss2vec 550 outputs its feature representation $v^{(k,j)}$, and Vec2HI 560 gives a RUL estimation at j as $H_1^{(k,j)}$ 570 based upon $v^{(k,j)}$. Given a $k^{th}$ example of run-to-failure data $X^{(k)}$, Tss2Mat 510 outputs $V^{(k)}$ and then Mat2HIch 520 converts $V^{(k)}$ to the change point of HI, $H_{ch}^{(k)}$. Finally, HIch2HI 530 gives a RUL estimation at a $j^{th}$ time as $H_2^{(k,j)}$ 540 based upon $H_{ch}^{(k)}$. HIch2HI 530 can estimate $H_2^{(k,j)}$ based on a leaky truncated RUL function.

In various embodiments, Tss2vec 550 and Tss2Mat 510 can be identical except for their input and output. Tss2vec 550 and Tss2Mat 510 can share the same internal parameters. Tss2vec 550 can take a subsequence $x^{(k,j)}$ and generate a vector $v^{(k,j)}$. Tss2Mat 510 can just iterate the process for all j and concatenate all the vectors to be a matrix, Mat. The intuition behind this design is better feature representation works not only for RUL estimation but also for the feasible range estimation. It also helps to reduce the search space of parameters.

At training, the Dual-estimator can take an example of run-to-failure data $X^{(k)}$ 140 and its subsequence $x^{(k,j)}$ as the inputs at a time, and then the trained neural network model 170 can generate two RUL estimations, $H_1^{(k,j)}$ 570 and $H_2^{(k,j)}$ 540, where $H_1^{(k,j)}$ 570 is a value for the health index generated by Vec2HI 560, and $H_2^{(k,j)}$ 540 is a value for the health index generated by HIch2HI 530. The objective of the training is to find optimal values for parameters including hyper-parameters of the neural network model, so that it can provide the best performance at inference.

At inference, the trained neural network model 170 can receive a multivariate time series x 601 as the input for RUL estimation, then the trained neural network model outputs H, which is HI at the end of the time series data x.

In various embodiments, Tss2Mat 510 and Tss2vec 550 can each be a stacked Long Short-Term Memory (LSTM). LSTM networks, which are a variant of recurrent neural networks (RNN), can be used, in order to take temporal information into account. Vec2HI 560 can be a Multi-layer Perceptron. Mat2HIch can implement a function that can map a matrix to a single value. In various embodiments, for example, the same values can be set to the hyper-parameters of the LSTM, where the number of LSTM layers can be two, the number of nodes in the 1st LSTM Cell is 32, the number of nodes in the 2nd LSTM Cell is 64, the number of MLP layers is two, the number of nodes in both the 1st layer and the 2nd layer is 8.

In various embodiments, a weighted average of true RUL can be used, where the weights are determined by a neural network, so-called attention mechanism, based upon $v^{(k,j)}$ and must sum to one, independent of the length of sequence. It enforces the solution bounds to the maximum true RUL in the training examples to zero and to be represented by the weight average. Let $R^{(k,j)}$ be the true RUL at the $j^{th}$ time index in the $k^{th}$ run-to-failure and $a^{(k,j)}$ be the weight, then:

$$H_{ch}^k = \Sigma_{j=0}^{lk} a^{(k,j)} R^{(k,j)},$$

where "a" is a weight of the R. "a" is computed based on feature vectors v as shown in the next equation. The gated attention mechanism is employed to capture complex relationships among feature representations. A sigmoid function can play the role of the gate. The gated attention mechanism gives the weights as:

$$a^{(k,j)} = \frac{\exp\{w(\tanh(Pv^{(k,j)}) \odot sigm(Qv^{(k,j)}))\}}{\sum_{i=0}^{l_k} k\{w(\tanh(Pv^{(k,j)}) \odot sigm(Qv^{(k,j)}))\}},$$

where w, P, and Q are parameters, $\odot$ is element-wise multiplication, sigm( ) is sigmoid function, and C is the number of elements in w.

The simplest HIch2HI is the piece-wise RUL function, however the gradient is zero for the region from $H_{ch}$ to later times. This function has no gradient at the region whose value is $H_{ch}$. This may lead to a longer training time or a sub-optimal solution when the neural networks are optimized with back propagation. When an input data segment is mapped to $H_{ch}$ or a larger value, the segment doesn't contribute updating parameters in Mat2HIch. In order to deal with the potential problem, a negative slope can be provided for the region greater than $H_{ch}$. The function is then referred to as leaky truncated RUL function, H(R), which is similar to leaky ReLU that yields:

$$\mathcal{H}(x) = \min(y_1(R), y_2(R)),$$

where:

$$y_1(R) = -a_1(-R + H_{ch}) + H_{ch},$$

$$y_2(R) = -a_2(-R + H_{ch}) + H_{ch},$$

where $a_1$ and $a_2$ are parameters and $a_2 \ll a_1$.

In various embodiments, the Dual-estimator gives two estimation of RUL at the time index j; $H_1^{(k,j)}$ and $H_2^{(k,j)}$. Although they are from different methods, they are similar to each other. RMSE is a typical measure of the difference between two attributes. Minimization 580 of the difference between $H_1^{(k,j)}$ and $H_2^{(k,j)}$ is an objective and the loss $L_b$, called root mean square error (RMSE) loss, is given by:

$$L_b = \Sigma_{(j,k)} (H_1^{(j,k)} - H_2^{(k,j)})^2,$$

where $<j, k>$ represents a pair of the indices in the training data, where the $<,>$ is a notation to show a set for the summation. Although $L_b$ is the sum of the squared errors between $H_1$ and $H_2$ due to convenience for optimization, it can be easily converted to RMSE.

The $H_1^{(k,j)}$ 570 can be arbitrary, but $H_2^{(k,j)}$ is not. The $H_2^{(k,j)}$ 540 is constrained by the leaky truncated RUL function, which means there is only one parameter to change its value over $k^{th}$ example of run-to-failure data. In addition, $H_2^{(k,j)}$ is more accurate because Mat2HIch and HIch2HI can observe entire run-to-failure data and it includes future information from the perspective of the pipeline with TSS2Vec and Vec2HI. Due to these mechanisms, $H_2^{(k,j)}$ acts as a teacher for TSS2Vec and Vec2HI. Eventually, the pipeline with TSS2Vec and Vec2HI gives an accurate RUL estimation without future information. However, it is inappropriate just to minimize the difference due to the trivial solution, which is $H_{ch}^{(k)} = 0$. When $H_{ch}^{(k)} = 0$, $H_1^{(k,j)}$ and H2(k,j) become zero and it is easily achievable just ignoring values in input data X(k). In order to avoid a trivial solution, a term of an auxiliary loss, called value loss, is added, which is given by:

$$L_v = \sum_{(j,k)} \left(\frac{1}{H_{ch}^{(k)}}\right)^2.$$

Note that $H_{ch}^{(k)}$ is given for every j as well, since a pair of $X^{(k)}$ and its subsequence $x^{(k,j)}$ is the input and a training sample. This auxiliary loss enforces to have larger values of Hch(k), and affects the representation learning at Tss2Vec 550 due to weight sharing, where Tss2Vec and Tss2Mat are identical, such that when a parameter in Tss2Vec changes, the corresponding parameter in Tss2Mat also changes and vice versa. This means better feature representation should give not only better RUL estimation but also better values of the change point of HI. Finally, the loss function L is given by:

$$L = L_b + \lambda L_v,$$

where $\lambda$ is a hyper-parameter.

Available data for training can be divided into training data and validation data. The NN model can be trained with the Mini-batch gradient descent and its parameters are optimized with every training sample for the number of iterations. During the iteration, a performance metric is computed for the validation data. If the performance metric is better than that from the previous iteration, the parameters are kept as the best parameter at the moment. In order to determine the best hyper-parameter, a cross-validation method is employed.

In various embodiments, the performance metric should be designed for each use case based upon its requirements. In various cases, there is a range of interest for RUL estimation since no action is needed at sufficient RUL and no action can be taken once the RUL is very short.

In various embodiments, let $h_{est}(i)$ be an estimated RUL, and $h_{true}(i)$ be the true RUL. Given the range as $r_{min}$ to $r_{max}$ and an estimation error d(i), then the performance metric P is given as:

$$P = \Sigma_{i \in D} \mathcal{P}(d^{(i)}),$$

where:

$$d^{(i)} = h_{est}^{(i)} - h_{true}^{(i)},$$

$$D = \{i \in \mathbb{N} \mid r_{min} \leq r_i \leq r_{max}\},$$

and P(.) is a function to compute the performance metric for an estimation, where it can be a Root Mean Square Error and acceptable prediction. Note that the training metric is not limited to this notation. It can be any metrics in prognostics, where metrics are values to measure performance, and prognostics is an engineering discipline focused on predicting the time at which a system or a component will no longer perform its intended function.

In order to stabilize the training, other self-supervised training tasks may be incorporated. One of the tasks is classification to identify the healthy stage 410 and/or the degrading stage 420. By adding a new loss term $L_c$, called the classification loss, the loss function is then given by:

$$L = L_b + \lambda_1 L_v + \lambda_2 L_c,$$

where $$L_c = -\sum_{(j,k)} y_0^{(k,j)} \log \hat{y}_0^{(k,j)} + y_1^{(k,j)} \log \hat{y}_1^{(k,j)},$$

$$\hat{y}_0^{(k,j)} = \frac{1}{1 + \exp\{-\alpha(H_{ch}^{(k)} - H_1^{(k,j)})\}},$$

where this equation represents the approximation of the indicator function with respect to a predicted value of $\hat{y}_0^{(k,j)}$, $$\hat{y}_1^{(k,j)} = 1 - \hat{y}_0^{(k,j)},$$

$$y_0^{(k,j)} = \begin{cases} 1, & R^{(j,k)} > H_{ch}^{(k)} \\ 0, & \text{otherwise} \end{cases},$$

$$y_1^{(k,j)} = 1 - y_0^{(k,j)},$$

where $\lambda_1$, $\lambda_2$, and $\alpha$ are hyper-parameters, and $\alpha$ must be a negative value. Under this condition, the larger $H_1$ is, the closer the value of $\hat{y}_0^{(k,j)}$ is to 1, and the smaller $H_1$ is, the closer the value of $\hat{y}_0^{(k,j)}$ is to 0. $\hat{y}_0^{(k,j)}$ can be viewed as a probability that the sample is assigned to class 0, where class 0 is for healthy samples whose HI are larger than Hch, which would fall in the healthy stage 410. Instead of hard labeling for classification loss, soft labeling can be used. In this case, it can be given as:

$$y_0^{(k,j)} = \frac{1}{1+\exp\{-\alpha(H_{ch}^{(k)} - R^{(j,k)})\}}.$$

Under this condition, the larger R is, the closer the value of $y_0^{(k,j)}$ is to 1, and the smaller R is, the closer the value of $y_0^{(k,j)}$ is to 0.

When it comes to actual use cases, it is not important to accurately estimate RUL during healthy stages because no maintenance actions would be taken during that stage, as long as the stage can be accurately identified as healthy 410. The classifier may be relied on to judge whether it is healthy or not.

Figure 6:
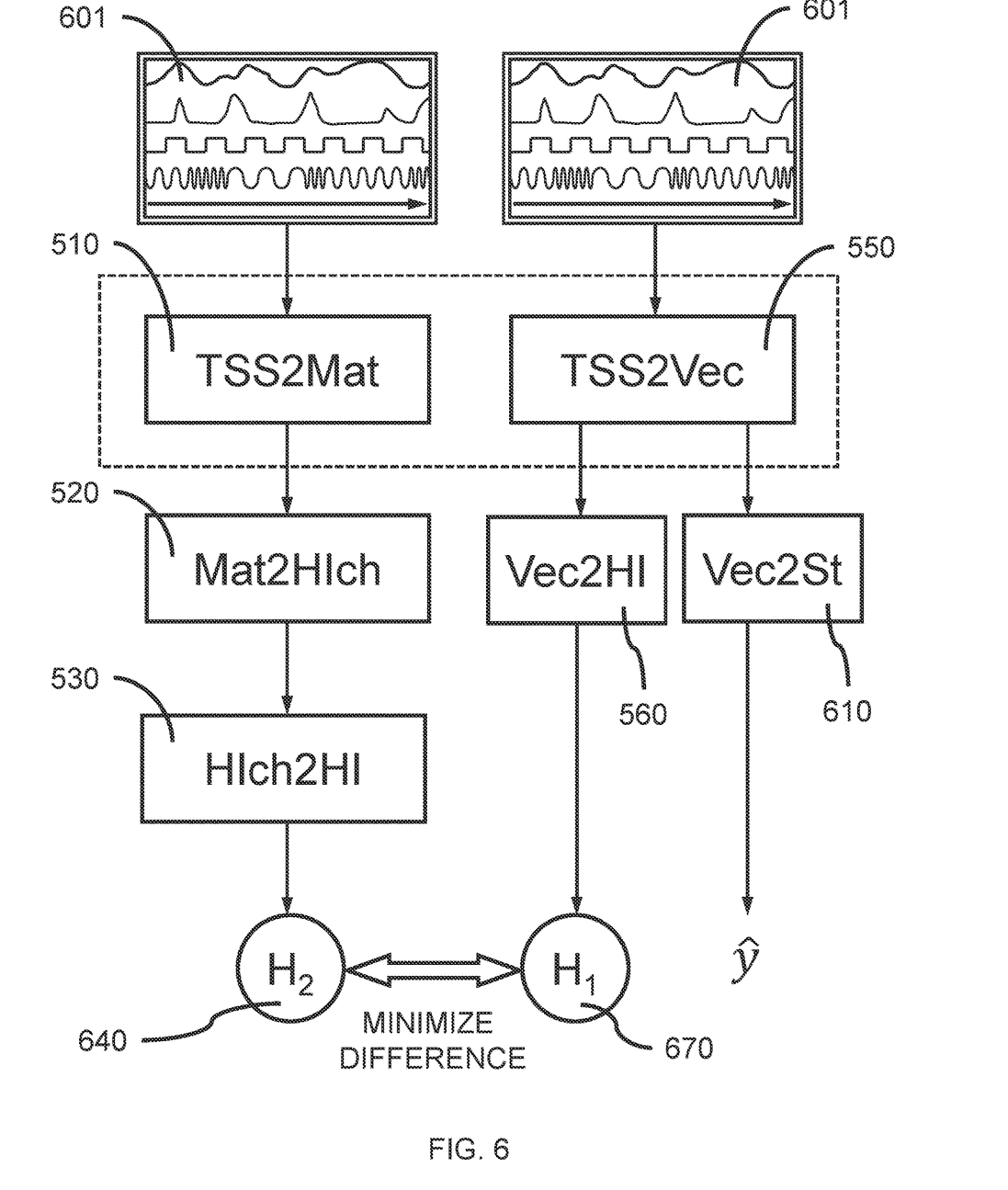
FIG. 6 is a block/flow diagram illustrating a high-level system/method for a dual estimator RUL model with stage classification implementing Vec2St, in accordance with an embodiment of the present invention.

FIG. 6 is a block/flow diagram illustrating a high-level system/method for a dual estimator RUL model with stage classification implementing Vec2St, in accordance with an embodiment of the present invention.

In order for RULENet to optimize performance for degrading and predictable periods, it's rational to simultaneously train a model for RUL estimation and for stage classification. In order to do so, a component, Vec2St 610, can be added to the Dual-estimator. It takes output from Tss2Vec 550 and then outputs a probability for each stage, i.e., healthy stage 410 and degrading stage 420. Vec2St 610 can be a Multilayer Perceptron with two output nodes and a softmax activation layer for the output nodes. In this case, let $f^{(k,j,i)}$ be value of the $i^{th}$ output node, then the probability of ii class is given as:

$$\hat{y}_i^{(k,j)} = \frac{\exp(f^{(k,j,i)})}{\sum_{\langle c \rangle} \exp(f^{(k,j,i)})},$$

where <c> is the set of classes. The denominator is the sum of $\exp(f^{(k,j,i)})$ over classes, c.

The loss function can be the same with $L=L_b+\lambda_1 L_v+\lambda_2 L_c$, but $$\hat{y}_i^{(k,j)} = \frac{\exp(f^{(k,j,i)})}{\sum_{\langle c \rangle} \exp(f^{(k,j,i)})},$$

is used for classification loss. The term $L_b$ in the loss function can be weighted based on classification results, so that estimation error can be ignored if the healthy stages are identified correctly. In this case, the loss function can be given as:

$$L=(1-y_0^{(k,j)}\hat{y}_0^{(k,j)})Lb+\lambda_1 Lv+\lambda_2 Lc,$$

In various embodiments, the performance metric at validation also considers the weight, $(1-y_0^{(k,j)}\hat{y}_0^{(k,j)})$, for samples from the degrading stage or samples incorrectly classified as healthy. In this case the performance metric is given as:

$$P=\Sigma_{i\in D}(1-y_0^{(k,j)}\hat{y}_0^{(k,j)})\mathcal{P}(d^{(i)}),$$

where $d^{(i)}=h_{est}^{(i)}-h_{true}^{(i)}$, $D=\{i\in\mathbb{N}\ r_{min}\leq r_i\leq r_{max}\}$, and $\mathcal{P}(.)$ is a function to compute the performance metric for an estimation, where it can be a Root Mean Square Error (RMSE) and an acceptable prediction.

The classifier can help to reduce false positive when the alarm is suppressed based on classification results. One possible condition to suppress alarms is that the classifier says it's normal, but the estimated RUL is smaller than pre-determined threshold.

In various embodiments, health stage classification can be conducted, where estimating the health stage of the time series fed to the second neural network can be based on a fourth neural network, Vec2St, and minimizing the estimation error of the health stage. In order for RULENet to optimize performance for degrading and predictable periods, a model for RUL estimation and for stage classification are simultaneously trained. In order to do so, a component, Vec2St is added to the Dual-estimator. It takes output from Tss2Vec and then outputs probability for each stage, i.e., healthy stage and degrading stage. Vec2St can be Multilayer Perceptron with two output nodes and a softmax activation layer for the output nodes. In this case, let f(k, j, i) be value of $i^{th}$ output node, then the probability of $i^{th}$ class is given as:

$$\hat{y}_i^{(k,j)} = \frac{\exp(f^{(k,j,i)})}{\sum_{\langle c \rangle} \exp(f^{(k,j,i)})},$$

this can be used for classification loss. The term $L_b$ in the loss function can be weighted based on classification results so that estimation error can be ignored if the healthy stages are identified correctly.

Figure 7:
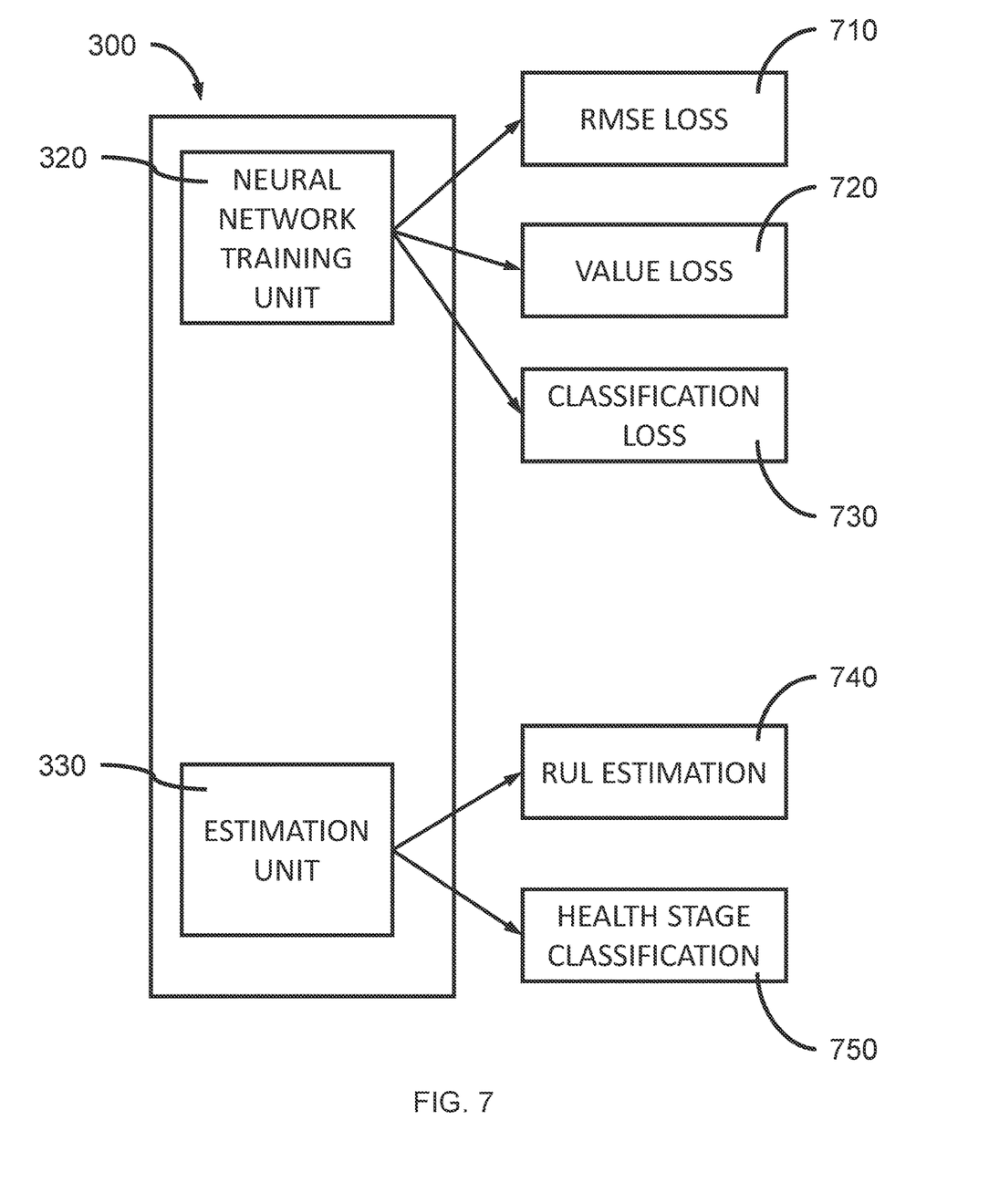
FIG. 7 is a flow diagram illustrating a system/method for implementing a remaining useful life (RUL) Maintenance Planning System, in accordance with an embodiment of the present invention.

FIG. 7 is a flow diagram illustrating a system/method for implementing a remaining useful life (RUL) Maintenance Planning System, in accordance with an embodiment of the present invention.

In various embodiments, the neural network system 300 can include the neural network training unit 320 and the estimation unit 330. The neural network training unit 320 can calculate and optimize an RMSE loss 710, a value loss 720, and a classification loss 730. The estimation unit 330 can provide a RUL estimation value 740 and a health stage classification 750.

RULENet simultaneously optimizes its Dual-estimator for RUL estimation and the change point estimate from unpredictable health stage to predictable health stage and health stage classification.

Figure 8:
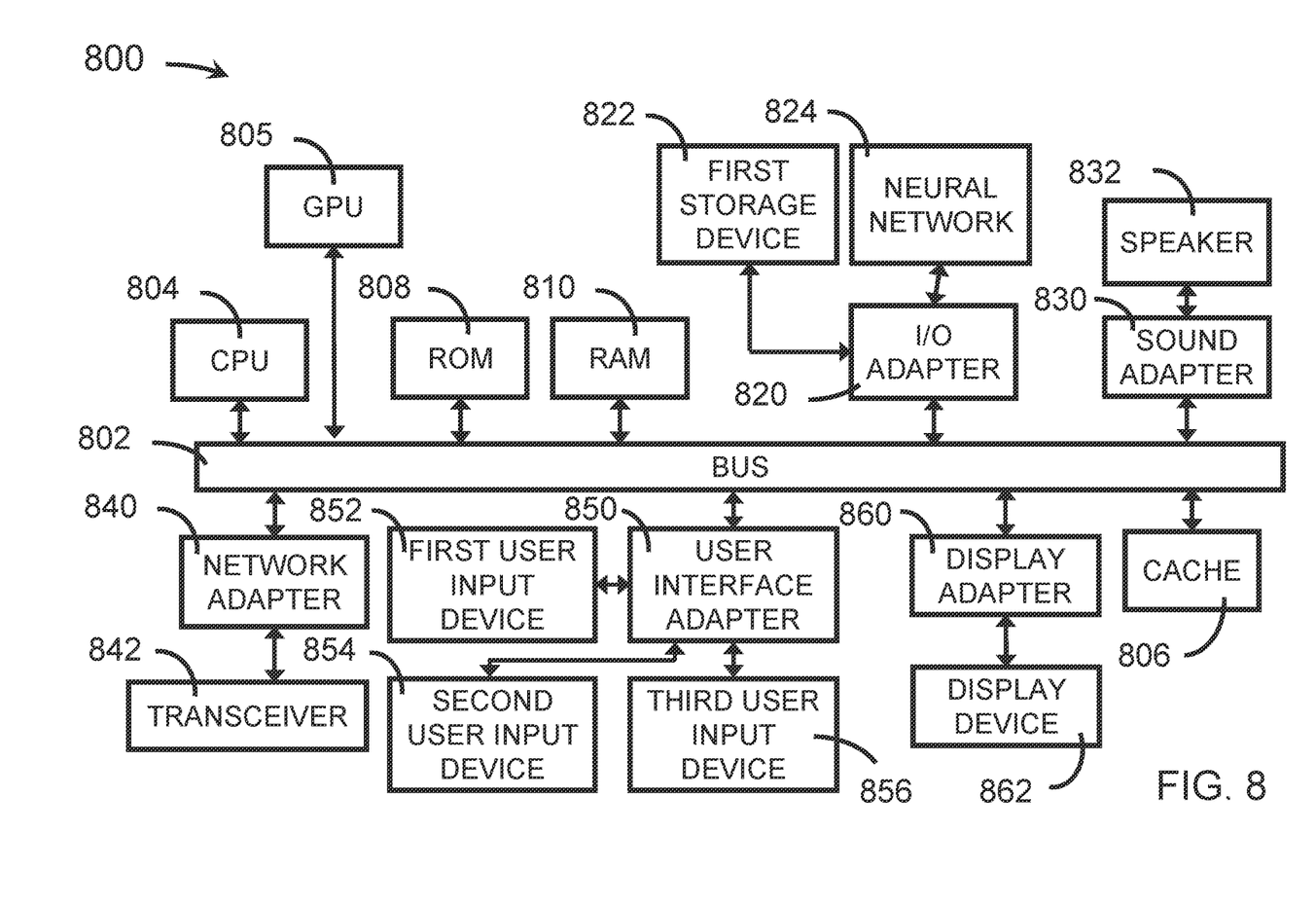
FIG. 8 is an exemplary processing system 800 to which the present methods and systems may be applied, in accordance with an embodiment of the present invention.

FIG. 8 is an exemplary processing system 800 to which the present methods and systems may be applied, in accordance with an embodiment of the present invention.

The processing system 800 can include at least one processor (CPU) 804 and may have a graphics processing (GPU) 805 that can perform vector calculations/manipulations operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and/or a display adapter 860, can also be operatively coupled to the system bus 802.

A first storage device 822 and a second storage device 824 are operatively coupled to system bus 802 by the I/O adapter 820, where a neural network can be stored for implementing the features described herein. The storage devices 822 and 824 can be any of a disk storage device (e.g., a magnetic or optical disk storage device), a solid state storage device, a magnetic storage device, and so forth. The storage devices 822 and 824 can be the same type of storage device or different types of storage devices.

A speaker 832 can be operatively coupled to the system bus 802 by the sound adapter 830. A transceiver 842 can be operatively coupled to the system bus 802 by the network adapter 840. A display device 862 can be operatively coupled to the system bus 802 by display adapter 860.

A first user input device 852, a second user input device 854, and a third user input device 856 can be operatively coupled to the system bus 802 by the user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 can be used to input and output information to and from the processing system 800.

In various embodiments, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Moreover, it is to be appreciated that system 800 is a system for implementing respective embodiments of the present methods/systems. Part or all of processing system 1000 may be implemented in one or more of the elements of FIGS. 1-7. Further, it is to be appreciated that processing system 800 may perform at least part of the methods described herein including, for example, at least part of the method of FIGS. 1-7.

In various embodiments, the neural network system 300 can be implemented on the processing system 800, where the data acquisition unit 310, learning unit 320, RUL estimation unit 330, and output unit 340 can be stored in memory, where the neural network(s) (e.g., LSTM, MLP, etc.) may be stored in storage device 824. The received and collected time series data 140 can be stored in a database 150 that may reside in the first storage device 822 and/or the second storage device 824. The sensors 120 can be connected to and in electronic communication with system 800 through network adapter 840 and/or a communications port or other adapter. The output unit 340 can communicate with the users and user devices 220 through the network adapter 840 and/or communication ports.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for determining a remaining useful life (RUL) of an industrial system, comprising:
feeding historic time series data into a first neural network and a second neural network to train the first neural network and the second neural network, including processing sequential data collected for operational parameters of the industrial system, each capturing long-range dependencies within the time series data;
determining a point in time that a health index (HI) changes from a healthy stage in the system's life to a degradation stage by converting a feature representation output by the first neural network utilizing end-to-end learning for stabilizing model training;
estimating a first remaining useful life of the system based on the point in time that the health index (HI) changes from a healthy stage in the system's life to a degradation stage provided using a third neural network, the third neural network being a different type of neural network from the first neural network and the second neural network which further analyzes the time series data for accurate and efficient estimation of the RUL of components of the industrial system;
estimating a second remaining useful life of the system by converting a feature representation output by the second neural network;
minimizing a difference between the first remaining useful life and the second remaining useful life to further refine the estimation of the RUL of the components of the industrial system;
classifying the health stage at RUL estimation to suppress false positive alarms based on a determination of a probability of the industrial system being in a healthy stage or a degradation stage; and
sending a warning to a user based on the determination that the system is in the degradation stage.

2. The method as recited in claim 1, further comprising: collecting the historic time series data from a plurality of sensors associated with the system.

3. The method as recited in claim 1, wherein the first neural network is a stacked long short term memory neural network and the second neural network is a stacked long short term memory neural network.

4. The method as recited in claim 3, wherein the third neural network is a Multi-layer Perceptron with two output nodes and a softmax activation layer.

5. The method as recited in claim 4, wherein the third neural network calculates the probability of the healthy stage utilizing $$\hat{y}_i^{(k,j)} = \frac{\exp(f^{(k,j,i)})}{\sum_{(c)} \exp(f^{(k,j,i)})}.$$

6. The method as recited in claim 5, wherein converting a feature representation output by the first neural network includes a concatenation of all vectors to a matrix, and conversion of the matrix to a single value.

7. The method as recited in claim 5, wherein estimating a second remaining useful life by converting a feature representation output by the second neural network includes changing a vector to a single value.

8. A computer system for determining a remaining useful life (RUL) of an industrial system, comprising:
one or more processors;
a memory coupled to the one or more processors;
a data acquisition unit configured to receive run-to-failure time series data, and to feed the time series data into a first neural network and a second neural network;
a neural network training unit configured to train the first neural network and the second neural network by processing sequential data collected for operational parameters of the industrial system, each capturing long-range dependencies within the time series data to determine a point in time that a health index (HI) changes from a healthy stage in the system's life to a degradation stage by converting a feature representation output by the first neural network utilizing end-to-end learning for stabilizing model training;
a remaining useful life estimation unit configured to estimate a first remaining useful life of the system based on the point in time that the health index (HI) changes from a healthy stage in the system's life to a degradation stage provided using a third neural network, the third neural network being a different type of neural network from the first neural network and the second neural network which further analyzes the time series data for accurate and efficient estimation of the RUL of components of the industrial system;

estimate a second remaining useful life of the system by converting a feature representation output by the second neural network;

minimize a difference between the first remaining useful life and the second remaining useful life to further refine the estimation of the RUL of the components of the industrial system;

classify the health stage at RUL estimation to suppress false positive alarms based on a determination of a probability of the industrial system being in a healthy stage or a degradation stage; and an output unit configured to send a warning to a user based on the determination that the system is in the degradation stage.

9. The computer system as recited in claim 8, further comprising:
a monitoring system configured to collect the time series data from a plurality of sensors associated with the system.

10. The computer system as recited in claim 8, wherein the first neural network is a stacked long short term memory neural network and the second neural network is a stacked long short term memory neural network.

11. The computer system as recited in claim 10, wherein the third neural network is a Multi-layer Perceptron with two output nodes and a softmax activation layer.

12. The computer system as recited in claim 11, wherein the third neural network calculates the probability of the healthy stage utilizing $$\hat{y}_i^{(k,j)} = \frac{\exp(f^{(k,j,i)})}{\sum_{(c)} \exp(f^{(k,j,i)})}.$$

13. The computer system as recited in claim 12, wherein converting a feature representation output by the first neural network includes a concatenation of all vectors to a matrix, and conversion of the matrix to a single value.

14. The computer system as recited in claim 13, wherein estimating a second remaining useful life by converting a feature representation output by the second neural network includes changing a vector to a single value.

15. A computer program product for determining a remaining useful life (RUL) of an industrial system, the computer program product comprising a non-transitory computer readable storage medium having program instructions embodied therewith, the program instructions executable by a computer to cause the computer to perform a method comprising:

feeding historic time series data into a first neural network and a second neural network to train the first neural network and the second neural network, including processing sequential data collected for operational parameters of the industrial system, each capturing long-range dependencies within the time series data;

determining a point in time that a health index (HI) changes from a healthy stage in the system's life to a degradation stage by converting a feature representation output by the first neural network utilizing end-to-end learning for stabilizing model training;

estimating a first remaining useful life of the system based on the point in time that the health index (HI) changes from a healthy stage in the system's life to a degradation stage provided using a third neural network, the third neural network being a different type of neural network from the first neural network and the second neural network which further analyzes the time series data for accurate and efficient estimation of the RUL of components of the industrial system;

estimating a second remaining useful life of the system by converting a feature representation output by the second neural network;

minimizing a difference between the first remaining useful life and the second remaining useful life to further refine the estimation of the RUL of the components of the industrial system;

classifying the health stage at RUL estimation to suppress false positive alarms based on a determination of a probability of the industrial system being in a healthy stage or a degradation stage; and sending a warning to a user based on the determination that the system is in the degradation stage.

16. The computer program product as recited in claim 15, further comprising instructions executable by a computer to cause the computer to perform a method comprising:
collecting the historic time series data from a plurality of sensors associated with the system.

17. The computer program product as recited in claim 15, wherein the first neural network is a stacked long short term memory neural network and the second neural network is a stacked long short term memory neural network.

18. The computer program product as recited in claim 17, wherein the third neural network is a Multi-layer Perceptron with two output nodes and a softmax activation layer.

19. The computer program product as recited in claim 18, wherein the third neural network calculates the probability of the healthy stage utilizing $$\hat{y}_i^{(k,j)} = \frac{\exp(f^{(k,j,i)})}{\sum_{(c)} \exp(f^{(k,j,i)})}.$$

20. The computer program product as recited in claim 19, wherein converting a feature representation output by the first neural network includes a concatenation of all vectors to a matrix, and conversion of the matrix to a single value, and wherein estimating a second remaining useful life by converting a feature representation output by the second neural network includes changing a vector to a single value.

* * * * *